(12) United States Patent
Frost

(10) Patent No.: US 6,752,433 B2
(45) Date of Patent: Jun. 22, 2004

(54) SWIVEL COUPLING

(75) Inventor: Brian L. Frost, Mt. Juliet, TN (US)

(73) Assignee: Campbell Hausfeld/Scott Fetzer Company, Harrison, OH (US)

( * ) Notice: Subject to any disclaimer, the term of this patent is extended or adjusted under 35 U.S.C. 154(b) by 0 days.

(21) Appl. No.: 10/228,656

(22) Filed: Aug. 27, 2002

(65) Prior Publication Data

US 2004/0041395 A1 Mar. 4, 2004

(51) Int. Cl.$^7$ .................................................. F16L 17/00

(52) U.S. Cl. ............................ 285/98; 285/89; 285/354

(58) Field of Search ........................ 285/98, 86, 89, 285/148.4, 281, 278, 276, 309, 331, 354, 386

(56) References Cited

U.S. PATENT DOCUMENTS

| | | |
|---|---|---|
| 170,155 A | 11/1875 | Caswell |
| 736,908 A | 8/1903 | Wright |
| 738,503 A | 9/1903 | Waters |
| 883,941 A | 4/1908 | Eagan |
| 1,088,847 A | 3/1914 | Sutton |
| 1,329,760 A | 2/1920 | Fulton |
| 1,371,882 A | 3/1921 | Ferguson et al. |
| 1,873,304 A | 8/1932 | De Mooy |
| 2,069,377 A | 2/1937 | Matthiessen, Jr. |
| 2,225,610 A | 12/1940 | Christian |
| 2,253,018 A | 8/1941 | Cowles |
| 2,298,117 A | 10/1942 | Franck |
| 2,384,360 A * | 9/1945 | Allen et al. ................ 285/98 |
| 2,463,253 A | 3/1949 | Earle et al. |
| 2,470,256 A | 5/1949 | McIlroy |
| RE23,120 E | 6/1949 | Earle et al. |
| 2,521,701 A | 9/1950 | Earle et al. |
| 2,674,469 A | 4/1954 | Earle et al. |
| 2,699,961 A | 1/1955 | Omon et al. |
| 2,736,578 A | 2/1956 | Rafferty |
| 2,833,568 A * | 5/1958 | Corsette .................... 285/98 |
| 2,860,893 A | 11/1958 | Clark |
| 3,011,803 A | 12/1961 | Buckner et al. |
| 3,142,498 A | 7/1964 | Press |
| 3,229,996 A | 1/1966 | Cadwell |
| 3,314,694 A | 4/1967 | Faccou |
| 3,317,220 A | 5/1967 | Bruning |
| 3,346,276 A | 10/1967 | Snyder, Jr. |
| 3,351,362 A | 11/1967 | Hansen |
| 3,361,451 A | 1/1968 | Murray et al. |
| 3,423,110 A | 1/1969 | Hansen et al. |
| 3,549,175 A | 12/1970 | Evans |
| 3,761,117 A | 9/1973 | Shendure |
| 3,817,560 A | 6/1974 | Guertin |
| 3,900,221 A | 8/1975 | Fouts |
| 3,922,011 A | 11/1975 | Walters |
| 4,113,288 A | 9/1978 | Cox |
| 4,148,459 A | 4/1979 | Martinez |
| 4,198,080 A | 4/1980 | Carpenter |

(List continued on next page.)

FOREIGN PATENT DOCUMENTS

DE 2653976 * 6/1978 .................. 285/96

Primary Examiner—Lynne H. Browne
Assistant Examiner—Aaron Dunwoody
(74) Attorney, Agent, or Firm—Jones Day

(57) ABSTRACT

A swivel coupling comprises a male member having an annular groove formed on an outer surface and a female member overlapping the male member to form a central flow passageway. An annular groove is defined at an end of the female member and the annular groove of the female member is positioned adjacent the annular groove of the male member. A locking member is movably mounted around the male and female members and an annular groove on the locking member is positioned adjacent the annular grooves of the male and female members. The grooves together define an annular ball race. A plurality of ball bearings are trapped in the ball race and the male member is rotatable relative to the female member about the ball bearings.

25 Claims, 3 Drawing Sheets

U.S. PATENT DOCUMENTS

| | | | |
|---|---|---|---|
| 4,240,654 A | 12/1980 | Gladieux | |
| 4,478,438 A | 10/1984 | Elorriaga, Jr. | |
| 4,500,119 A | 2/1985 | Geberth, Jr. | |
| 4,527,816 A | 7/1985 | Bresie et al. | |
| 4,609,211 A | 9/1986 | Abbes et al. | |
| 4,647,079 A | 3/1987 | Ohlsson | |
| 4,647,081 A | 3/1987 | Landgraf et al. | |
| 4,653,780 A | 3/1987 | Lalikos | |
| 4,660,868 A * | 4/1987 | Totani | 285/354 |
| 4,664,420 A * | 5/1987 | Demeri | 285/86 |
| 4,676,267 A | 6/1987 | Bloch | |
| 4,781,399 A * | 11/1988 | Collon | 285/8 |
| 4,817,996 A | 4/1989 | Fouts | |
| 4,824,124 A | 2/1989 | Albagnac | |
| 5,116,086 A | 5/1992 | Psajd | |
| 5,149,148 A | 9/1992 | Taeuber, Jr. et al. | |
| 5,161,831 A | 11/1992 | Eckhardt | |
| 5,165,734 A | 11/1992 | Smith | |
| 5,340,168 A | 8/1994 | Barker | |
| 5,496,075 A | 3/1996 | Ostermann | |
| 5,538,296 A | 7/1996 | Horton | |
| 5,547,233 A | 8/1996 | Hoegger | |
| 5,735,552 A | 4/1998 | Elliott-Moore | |
| 5,816,624 A | 10/1998 | Smith | |
| 6,003,907 A | 12/1999 | Gau et al. | |
| 6,053,539 A | 4/2000 | Bravo | |
| 6,086,112 A | 7/2000 | Schofield et al. | |
| 6,164,707 A | 12/2000 | Ungchusri et al. | |
| 6,412,829 B1 * | 7/2002 | Persson | 285/86 |
| 2002/0024219 A1 * | 2/2002 | Eidsmore | 285/276 |

* cited by examiner

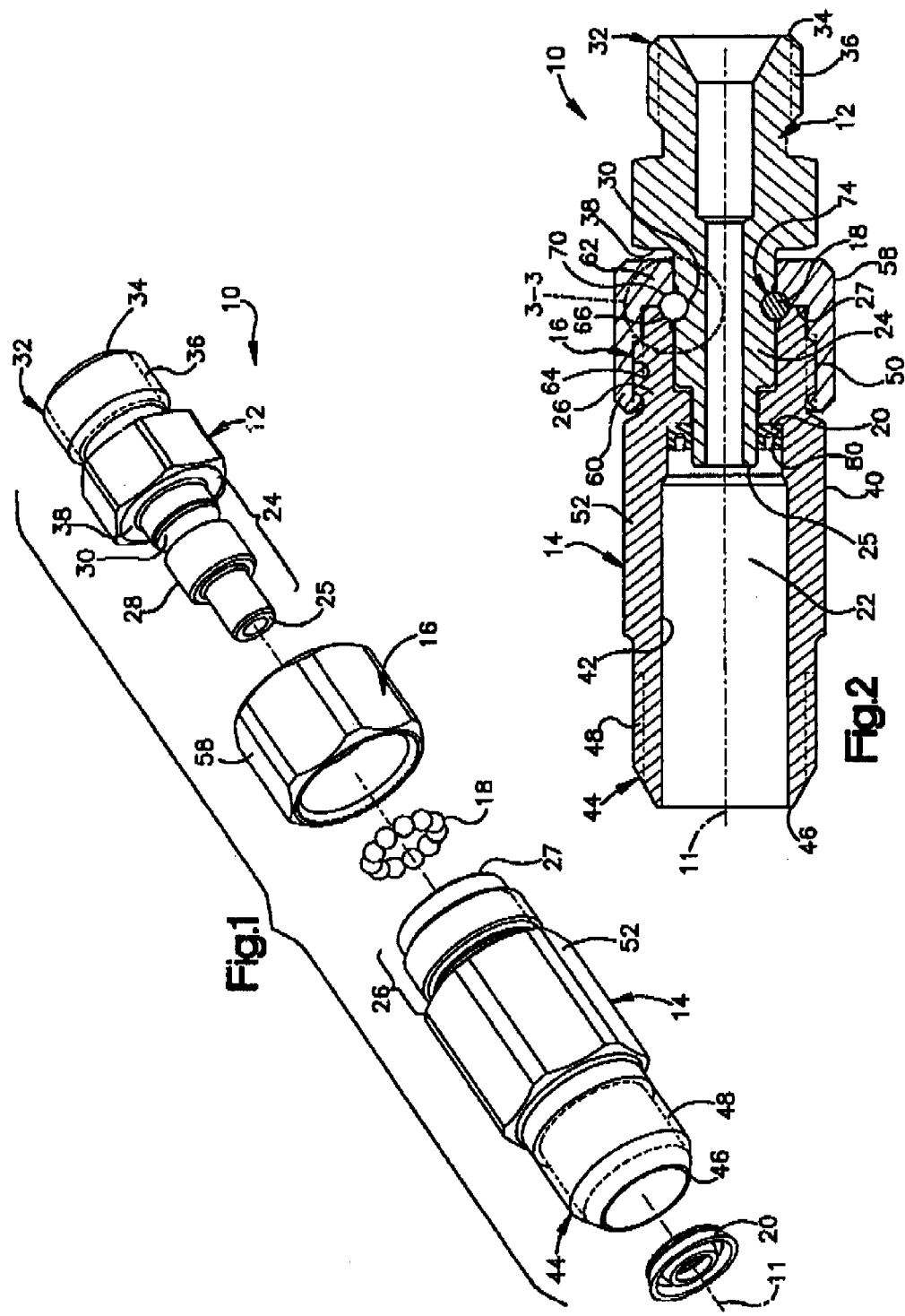

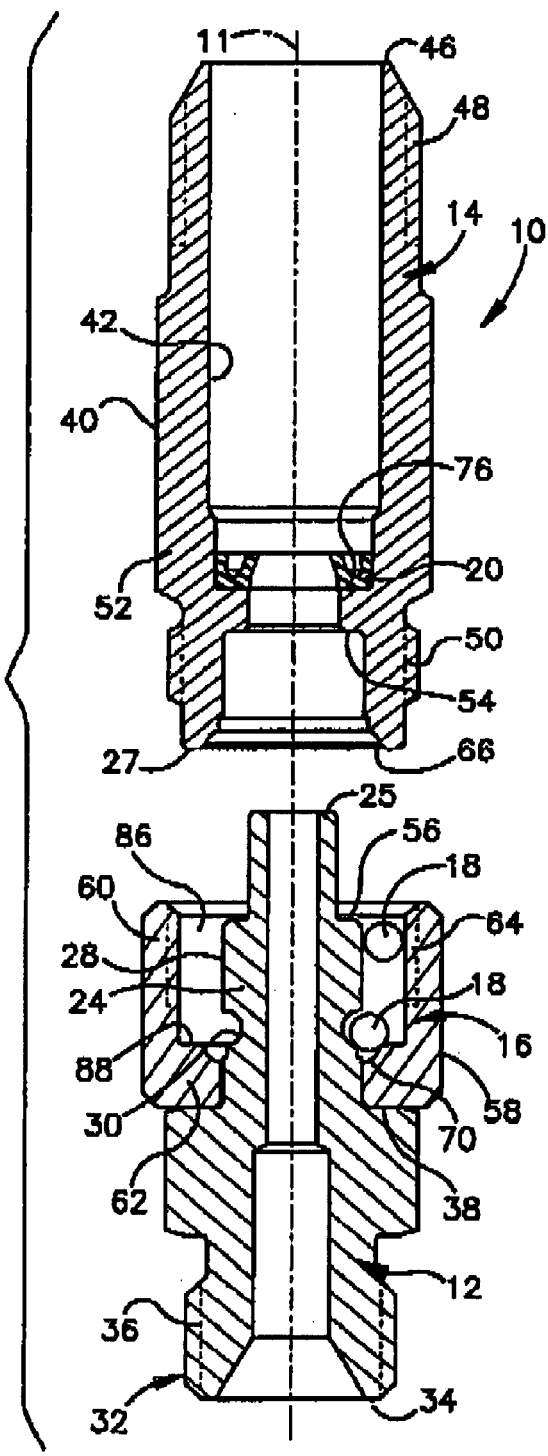

SWIVEL COUPLING

FIELD OF THE INVENTION

The claimed invention relates to a coupling having a first member that is rotatable relative to a second member and to a method of assembling a coupling.

BACKGROUND OF THE INVENTION

Hoses are used for the transfer of high-pressure fluids in hand held spray guns and wands. Such spray guns and wands are used in pressure washers and airless paint sprayers, among other devices. Hoses are typically stiff and can be relatively difficult to manage when under pressure from the fluid being sprayed. Swivel couplings make the use of such hoses more manageable by allowing the spray gun or wand to rotate relative to the hose.

Ball bearings have been used in swivel couplings to transmit the load between the connected sections. Known devices are complicated in design and often include cross-drilled loading holes through which the ball bearings are loaded into a bearing race. Once the ball bearings are loaded into the race, the loading holes are plugged with hole plugs or other material in order to retain the balls in the race.

SUMMARY

The claimed invention concerns a swivel coupling comprising a male member, a female member, a locking member, and a plurality of ball bearings. The male member has an outer surface and a bore extending axially therethrough. An annular groove is formed on the outer surface of the male member. The female member has a bore extending axially therethrough and is configured to connect concentrically and rotatably with the male member. The female member overlaps the male member to form a common central flow passageway. An annular groove is defined at one end of the female member and is positioned adjacent the annular groove of the male member. The locking member is movably mounted around the male and female members and comprises an annular groove that is positioned adjacent the annular grooves of the female and male members. The grooves together defining an annular ball race. The ball bearings are trapped in the ball race and abutted by the annular grooves of the female, male, and locking members. The ball bearings are rotatable in the ball race and the female member is axially rotatable relative to the male member around the ball bearings.

In another embodiment of the invention, the swivel coupling comprises a male, female, and locking member, as discussed above. A plurality of ball bearings are trapped in the ball race. The ball bearings are rotatable in the ball race and the female member is axially rotatable relative to the male member around the ball bearings. A force applied to the male member is transmitted through the ball bearings to the locking member. The force has a force vector that diverges from an axis of the male member at an acute angle through the ball bearings and into the locking member.

In yet another embodiment, a method of assembling the swivel coupling includes positioning the male member so that a longitudinal axis of the male member is vertical and positioning the locking member around the male member such that the annular groove of the locking member is positioned in the vicinity of the annular groove of the male member. An annular channel is defined between the locking member and the male member and the annular channel has a cross-section larger than the diameter of the ball bearings. The method also includes dropping the plurality of ball bearings into the annular channel and inserting the female member into the annular channel such that the annular groove of the female member is positioned adjacent the male member annular groove. The method further includes moving the locking member over an outer surface of the female member until the locking member is locked to the female member. The annular grooves of the female, male, and locking members trap the plurality of ball bearings in the ball race.

BRIEF DESCRIPTION OF THE DRAWING FIGURES

FIG. 1 is an exploded perspective view of a swivel coupling according to the invention;

FIG. 2 is a cross-sectional view of the swivel coupling of FIG. 1 showing the coupling in an assembled configuration;

FIG. 4 is a cross-sectional view of the swivel coupling of FIG. 1 showing the coupling during an assembly method.

DETAILED DESCRIPTION OF THE INVENTION

Figure 3:
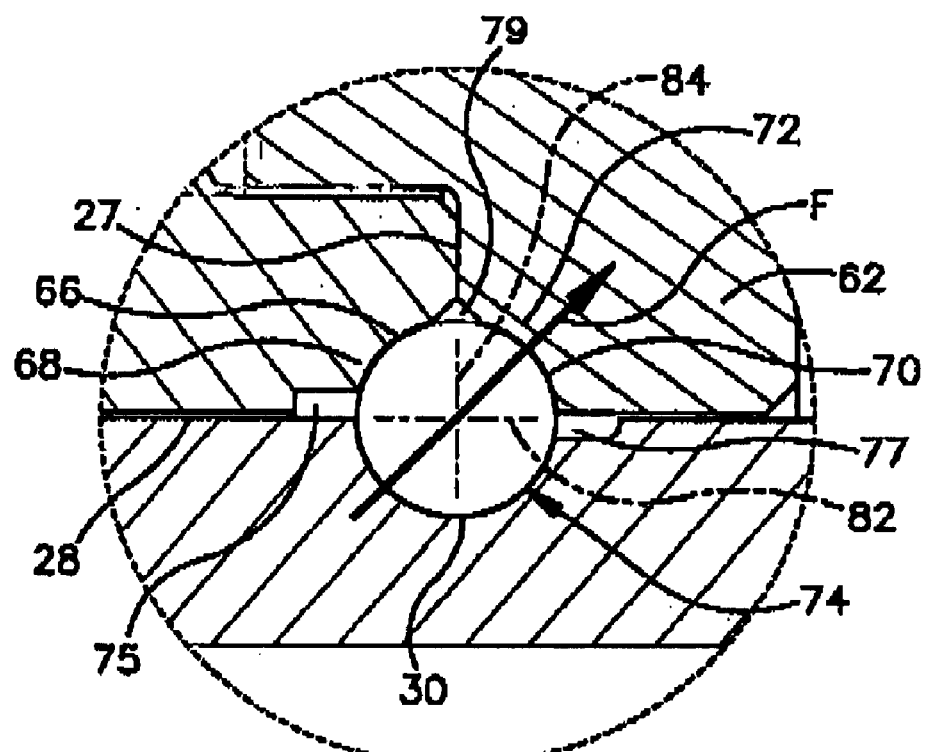
FIG. 3 is an expanded partial cross-sectional view taken from circled area 3—3 in FIG. 2.

The swivel coupling 10 of the claimed invention is depicted in FIGS. 1–4. FIGS. 1 and 4 show the coupling 10 prior to being fully assembled and FIG. 2 shows the coupling in an assembled configuration. The swivel coupling 10 is utilized to couple two parts in movable relation to each other and has two members that are axially rotatable relative to each other. Each of the members can be coupled to another part such that the coupled parts can rotate relative to each other through the members. For example, a swivel coupling 10 can be coupled at one end to a spray device, such as a pressure washer or airless handheld sprayer, and, at the other end, to a flexible hose. Alternatively, a flexible hose can be coupled to one end and a spray wand or nozzle can be coupled to the other end. The swivel coupling 10 allows the coupled parts to swivel or rotate relative to each other, while maintaining a fluid-tight transfer of fluids through the coupling 10. This rotating or swiveling action is advantageous when dealing with hoses that are under pressure, which can become stiff and unweildy. In addition, the swivel coupling 10 is fully operational under normal pressure loads and does not bind or otherwise resist rotation.

Referring to the figures, the swivel coupling 10 includes a male member 12, a female member 14, a nut or locking member 16, a series of ball bearings 18, and a seal 20, all of which are aligned on a common axis 11. The male and female members 12, 14 are sleeve-like and each includes an axially extending bore. As shown in FIG. 2, the male and female members 12, 14 mate to define a common flow passageway 22 at an overlapping end portion of each of the members. The overlapping end portion 24 of the male member 12 is bounded by its overlapped end 25. The overlapping end portion 26 of the female member 14 has an overlapping end 27 and is positioned radially outwardly from the overlapping end portion 24 of the male member 12.

The female member 14 has a radial dimension that allows it to rotate in an unimpeded manner relative to the male member 12. In a preferred embodiment, the male member 12 and locking member 16 are made of a stainless steel material, the ball bearings 18 are made of a hardened stainless steel material, and the female member 14 is made of brass. Other materials may also be utilized, as long as the materials are designed to withstand the pressure associated with use of the coupling 10, as will be discussed in greater detail below.

The male member 12 has an outer surface 28 and an annular groove 30 is defined on the outer surface 28. In a preferred embodiment, the groove 30 is semi-circular in shape. The outer surface 28 of the male member 12 has a varied profile. An attachment point 32 is positioned at the non-overlapping end 34 of the male member 12. The attachment point 32 is utilized to connect the coupling 10 to another part, such as a hose, a spray device, or the like. The attachment point 32 may include screw threads 36, or other types of attachment mechanisms known to those of skill in the art.

A shoulder 38 in the profile of the male member 12 is positioned adjacent the annular groove 30. The outer surface of the shoulder 38 is preferably shaped like a nut and is engagable by a wrench or similar tool. The nut-like configuration of the shoulder 38 is useful in attaching and detaching the male member 12 to an additional part.

The female member 14 is positioned around the overlapping end portion 24 of the male member 12. The female member 14 has an outer surface 40 and an inner surface 42. An attachment point 44 is located at the non-overlapping end 46 of the female member 14. The attachment point 44 is utilized to couple the female member 14 to another part, such as a hose, a spray wand, or the like. Screw threads 48 may be positioned on the outer surface 40 of the female member 14 at the non-overlapping end 46 for connection of the female member 14 to another part. Other types of attachment mechanisms may also be utilized at the attachment point 44, as known by those of skill in the art.

An attachment mechanism is also provided on the outer surface 40 of the female member 14 at the overlapping end portion 26. As shown in FIG. 2, a preferred attachment mechanism is screw threads, and the screw threads 50 are used to mate with the locking member 16. The female member 14 also has a varied profile, and a shoulder 52 is positioned adjacent the screw threads 50 and preferably has a nut-like exterior configuration. This shoulder 52 is utilized to hold the female member 14 in position while being coupled to the locking member 16, or for coupling the female member 14 to another part. The nut-like shoulder 52 can be used to hold the female member 14 in a stationary position when connecting the female member 14 to another part, or to rotate the female member 14 relative to another part. The female member 14 includes a blocking surface 54 in its profile that is positioned near a blocking surface 56 on the male member 12 when the coupling 10 is assembled. Blocking surface 54 is configured so that it will not touch blocking surface 56.

The locking member 16 is positioned around the outer surfaces 28, 40 of the male and female members 12, 14 in the vicinity of the overlapping end portions 24, 26. The locking member 16 has a generally cylindrical shape and, in a preferred embodiment, is shaped like a nut on its outer surface 58, as shown in FIG. 1. The locking member 16 includes a first portion 60 which extends axially from a position overlapping the female and male member overlapping end portions 24, 26. A second portion 62 extends radially inwardly from the first portion 60. The second portion 62 extends to the outer surface of the male member 12 adjacent the annular groove 30 in the male member 12 and is configured for sliding or rotating motion on the outer surface 28 of the male member 12 between the female member 14 and the shoulder 38. The inner side of the first portion 60 of the locking member 16 includes screw threads 64 for coupling to the screw threads 50 of the female member 14.

The overlapping end 27 of the female member 14 includes an annular groove 66. In a preferred embodiment, the groove is arcuate. The groove 66 is positioned at the inner corner 68 of the overlapping end 27. When the female member 14 is assembled around the male member 12, the annular groove 66 of the female member 14 is positioned directly adjacent the annular groove 30 of the male member 12, as shown in FIGS. 2–3. In addition, the locking member 16 includes an annular groove 70 that, in a preferred embodiment, is arcuate and positioned at an inner corner 72 of the second portion 62. When the locking member 16 is assembled on the male and female members 12, 14 such that the screw threads 50 of the female member 14 and the screw threads 64 of the locking member 16 are coupled together, the annular groove 70 of the locking member 16 is positioned adjacent the female member annular groove 66 and the male member annular groove 30. The three grooves 30, 66, 70 together define an annular ball race 74.

A plurality of ball bearings 18 are positioned in the ball race 74. The ball bearings 18 comprise a series of appropriately shaped rollers and are preferably made of a suitably hard material. The ball bearings 18 are trapped in the ball race 74 by the annular grooves 30, 66, 70 of the male, female, and locking members 12, 14, 16. In a preferred embodiment, as shown in FIG. 1, eleven ball bearings 18 are utilized and positioned adjacent each other in the ball race 74 to form a ring of ball bearings 18. The ball bearings 18 are freely rotatable relative to one another in the ball race 74. A clearance is provided between each ball bearing 18 in the race 74 to permit their radial movement. The number of balls is determined based upon the size of the race 74.

The ball race 74 is necessarily larger in diameter than the diameter of the ball bearings 18. In manufacturing the ball race 74, the race 74 is sized taking into consideration reasonable tolerances of the various parts.

A lubricant or grease (not shown) may be positioned in and adjacent to the ball race 74 to allow the ball bearings 18 to rotate more freely with less friction. As shown in FIG. 3, an annular indent 75 is formed on the inner surface 42 of the female member 14 and an annular indent 77 is formed on the outer surface 28 of the male member 12. The indents 75, 77 are positioned adjacent the ball race 74 and provide a reservoir for lubricant. In addition to providing a reservoir for lubricant, the indents 75, 77 help to trap debris that may remain after the manufacturing process, such as small chips of metal. The indents are positioned and configured to allow any debris to travel into the indents and out of the ball race, where the debris may interfere with free rotation of the ball bearings 18.

In addition, a chamfer is provided on each of the female member 14 and locking member 16 radially outwardly from the ball race 74. The chamfers together create a V-shaped notch 79 and are provided to soften any potentially sharp edges around the ball race 74. Sharp edges often carry imperfections such as burrs or dings. These imperfections can protrude into the ball race 74 and limit the free travel of the ball bearings 18 in the race 74. Therefore, it is desirable to soften the corners of the surfaces that surround the ball race 74. The notch 79 may also be used as a lubricant reservoir, along with the indents 75, 77.

An annular seal 20 is preferably positioned between the male member 12 and the female member 14 in the common flow passageway 22. As shown in FIG. 2, a seat 76 is located on the inner surface of the female member 14. The seat 76, when coupled to the male member 12, defines a channel 80. This channel 80 is configured for positioning of the annular seal 20 in an interference fit within the channel 80. The seal 20 conforms to the walls of the channel 80 and deters the flow of fluid from the central flow passageway 22 between the male and female members 12, 14. The seal 20 also prevents or deters fluid from entering the ball race 74 and deters grease or lubricant in the ball race 74 from entering the common flow passageway 22. The seal 20 is preferably made of an elastomeric polymer material, although other types of materials may alternatively be utilized.

When the swivel coupling 10 is assembled, the female and locking members 14, 16 are fixedly coupled to one another, and the male member 12 is axially rotatable relative to the female and locking members 14, 16 around the ball bearings 18. Referring to FIG. 3, in a preferred embodiment, the ball race 74 has a circular cross-section. In order to achieve a circular cross-section, the annular groove 30 of the male member 12 has a half circle shape and the annular grooves 66, 70 of the female and locking members 14, 16 have a quarter-circle shape. In a cross-section of the ball race 74, as shown in FIG. 3, the ball bearings 18 have a horizontal axis 82 and a vertical axis 84. The semi-circular annular groove 30 of the male member 12 is configured so that the outer surface 28 of the male member 12 is positioned in the vicinity of the horizontal axis 82 of the ball bearing 18. In a preferred embodiment, the outer surface 28 of the male member 12 is positioned on the horizontal axis 82. Furthermore, the female and locking member annular grooves 66, 70 meet in the vicinity of the vertical axis 84 of the ball bearing 18. More preferably, the female and locking members 14, 16 meet at the vertical axis 84 of the ball bearing 18. While the grooves 30, 66, 70 have been discussed herein as being arcuate, the groove may take other shapes.

The configuration of the ball race 74 assists in transferring forces from the male member 12 to the locking member 16 in a reduced-sheering manner. The mating lines for the various surfaces may vary slightly from the horizontal and vertical axes 82, 84 with similar success, depending on the pressure loads that are applied to the ball bearings 18.

In use, the male member 12 is subjected to pressure caused by the associated device, whether it be a paint sprayer, a pressure washer, or the like. The pressure on the male member 12 acts to pull the male member 12 away from the female member 14. The ball bearings 18 serve as a thrust bearing to maintain the male member 12 in association with the female member 14. The configuration of the ball race 74, as shown in FIG. 3, helps to transfer the pressure force F from the male member 12, through the ball bearings 18, and into the locking member 16. Thus, most of the force F is applied on the stainless steel parts of the coupling 10. Some force F is also transferred from the locking member 16 to the female member 14 through the adjoining threads 50, 64, but the force F is dissipated through the threads 50, 64. In this manner, the female member 14 can be made of a weaker material than the other parts, if so desired.

The force F applied through the ball bearings 18 has an axial and a transverse component and diverges at an acute angle from the longitudinal axis 11 of the male member. The force F has a conical shape, as represented by the force vector F shown in FIG. 3. The force vector F is angled at an approximately 45 degree angle relative to the axis of the coupling 10. This angle may vary, but is preferably not horizontal. A horizontal force vector would result in an increased sheering effect on the ball bearings 18, which is not desirable.

The swivel coupling 10 is easily assemblable. Unlike the prior art, a loading hole is not required to load the ball bearings 18 into the ball race 74. As shown in FIG. 4, the first step in assembling the swivel coupling 10 is to position the male member 12 in a vertical position so that the axis 11 of the male member 12 is vertical and the overlapped end 25 of the male member 12 is positioned above the non-overlapping end 34. The locking member 16 is concentrically positioned around the male member 12 so that the second portion 62 rests on the shoulder 38 and the first portion 60 surrounds the overlapping portion 24 of the male member 12. When the male member 12 and locking member 16 are in this vertical position, an annular channel 86 is defined between the first portion 60 of the locking member 16 and the outer surface 28 of the male member 12. The series of ball bearings 18 may then be dropped into the channel 86.

The annular channel 86 is dimensioned to receive the ball bearings 18 and is, accordingly, sized to allow the ball bearings 18 to drop to the bottom 88 of the channel 86 in an unimpeded manner. The annular grooves 30, 70 on the male member 12 and locking member 16 are configured, along with the position of the shoulder 38, so that the balls 18 will naturally fall into the grooves 30, 70 at the bottom 88 of the channel 86. Once all the balls 18 are positioned in the channel 86, it may be necessary to vibrate or jiggle the balls 18 so that each of the balls 18 falls into the grooves 30, 70. In this position, the grooves 30, 66, 70 are positioned in the vicinity of one another and provide a space into which the balls 18 may fall.

Once all the balls 18 are positioned in the grooves 30, 70, the female member overlapping portion 26 is inserted into the channel 86 around the male member 12 and inside the locking member 16. Prior to inserting the female member 14 into the channel 86, the seal 20 is positioned on the seal seat 76 of the female member 14. As the female member 14 is inserted into the channel 86, the male member 12 mates with the inner bore of the female member 14 and the seal 20.

The female member 14 comes to rest inside the channel 86 once the threads 64 of the locking member 16 are screwed onto the threads 50 of the female member 14. In this position, the annular groove 66 of the female member 14 is positioned adjacent the annular groove 30 of the male member 12 and the ball bearings 18 are trapped between the grooves 30, 66, 70. However, in this position, the ball race 74 is not in its final configuration.

In order to complete the assembly process, the locking member 16 is rotated so that the threads 64 on the locking member 16 engage the threads 50 on the female member 14. As the locking member 16 is screwed onto the female member 14, the annular groove 70 of the locking member 16 moves axially until it is positioned adjacent the annular groove 30 of the male member 12. As the locking member 16 is rotatingly mated with the female member 14, the annular groove 70 of the locking member 16 moves upwardly and traps the ball bearings 18 in the ball race 74. The locking member 16 is tightened down and halts its rotating movement once the locking member 16 second portion 62 meets the overlapping end 27 of the female member 14. In this position, the cross-section of the ball race 74 is in its final shape, which in the preferred embodiment is circular. While the ball race is shown and described as being circular, other embodiments may use a non-circular race, such as a square or rectangular race.

In this assembled position, the swivel coupling 10 is configured for use. The male and female members 12, 14 may be coupled to additional parts, such as a hose, a nozzle, a spray device, a wand, or the like, and are axially rotatable relative to each other. The ball bearings 18 are permanently retained in the ball race 74, but are removable and replaceable by unscrewing the locking member 16 from the female member 14.

Advantageously, the present invention provides a swivel coupling that is simple in construction, contains relatively few parts, is easy to assemble, rotates with relatively low torque, and is relatively inexpensive to produce.

While various features of the claimed invention are presented above, it should be understood that the features may be used singly or in any combination thereof. Therefore, the claimed invention is not to be limited to only the specific embodiments depicted herein.

Further, it should be understood that variations and modifications may occur to those skilled in the art to which the claimed invention pertains. The embodiments described herein are exemplary of the claimed invention. The disclosure may enable those skilled in the art to make and use embodiments having alternative elements that likewise correspond to the elements of the invention recited in the claims. The intended scope of the invention may thus include other embodiments that do not differ or that insubstantially differ from the literal language of the claims. The scope of the present invention is accordingly defined as set forth in the appended claims.

What is claimed is:

1. A swivel coupling comprising:
   a male member having an outer surface and a bore extending axially therethrough, with an annular groove formed on the outer surface;
   a female member having a bore extending axially therethrough configured to connect concentrically and rotatably with the male member, with the female member overlapping the male member to form a common central flow passageway, said female member having an annular groove defined at an end thereof; with the annular groove being positioned adjacent the annular groove of the male member;
   a locking member movably mounted around the male and female members, with a first portion of the locking member coupled to the female member and a second portion of the locking member associated with the male member, the second portion comprising an annular groove that is positioned adjacent the annular grooves of the female and male members, the grooves together defining an annular ball race; and
   a plurality of ball bearings trapped in the ball race and abutted by the annular grooves of the female, male, and looking members, wherein the ball beatings are rotatable in the ball race and the female member is axially rotatable relative to the male member around the ball beatings.

2. The swivel coupling of claim 1, wherein the locking member is movably coupled to the female member.

3. The swivel coupling of claim 2, wherein the locking member includes screw threads on an inner surface thereof and the female member includes screw threads on an outer surface thereof, and the screw threads of the locking member mate with the screw threads of the female member.

4. The swivel coupling of claim 3, wherein the screw threads on the locking member are positioned on the first portion thereof.

5. The swivel coupling of claim 1, wherein the second portion of the locking member includes a radially inwardly extending leg portion and the annular groove of the locking member is positioned on the leg portion.

6. The swivel coupling of claim 1, wherein the locking member second portion is movable along the outer surface of the male member.

7. The swivel coupling of claim 1, wherein the ball race has a circular cross-section.

8. The swivel coupling of claim 1, wherein the male member annular groove has a semi-circular cross-section.

9. The swivel coupling of claim 8, wherein the semi-circular cross-section is a half-circle having a diameter equal to or larger than a diameter of the ball bearing.

10. The swivel coupling of claim 1, wherein each of the male and female members include attachment points at an end thereof, said attachment points for coupling to an additional part.

11. The swivel coupling of claim 1, further comprising an annular seal positioned between the female and male members to deter the passage of fluid between the central flow passageway and the ball race.

12. The swivel coupling of claim 11, wherein the female member includes a shoulder on an inner surface thereof and the shoulder together with the outer surface of the male member defines a channel for positioning the seal in an interference fit into the channel.

13. The swivel coupling of claim 1, wherein the male member includes a shoulder positioned adjacent the annular groove of the male member, and the locking member is movable on the male member between the shoulder and the annular groove of the male member.

14. The swivel coupling of claim 1, wherein each of the ball bearings has a cross-section having a horizontal axis and a vertical axis, and the outer surface of the male member meets the female member and locking member in the vicinity of the horizontal axis or at the horizontal axis.

15. The swivel coupling of claim 14, wherein the female member meets the locking member at one of in the vicinity of the vertical axis or at the vertical axis.

16. The swivel coupling of claim 1, wherein, during use, force applied to the male member is transferred from the male member to the second portion of the locking member through the plurality of ball bearings in a vector that diverges at an acute angle from a longitudinal axis of the male member.

17. The swivel coupling of claim 16, wherein the force vector has a conical shape with a horizontal and a vertical component relative to the longitudinal axis of the male member.

18. The swivel coupling of claim 16, wherein the acute angle is about 45 degrees.

19. A swivel coupling comprising:
   a male member having an outer surface and a bore extending axially therethrough, with an annular groove formed on the outer surface;
   a female member having a bore extending axially therethrough configured to connect concentrically and rotatably with the male member, with the female member overlapping the male member to form a common central flow passageway, said female member having an annular groove defined at an end thereof, with the annular groove being positioned adjacent the annular groove of the male member;
   a locking member movably mounted around the male and female members, with a first portion of the locking member coupled to the female member and a second portion of the locking member associated with the male member, the second portion comprising an annular groove that is positioned adjacent the annular grooves of the female and male members, the grooves together defining an annular ball race; and a plurality of ball bearings trapped in the ball race, with the ball bearings being rotatable in the ball race and to female member being axially rotatable relative to the male member around the ball bearings, wherein a force applied to the male member is transmitted through the ball bearings to the locking member, with the force having a force vector that diverges from an axis of the male member at an acute angle through to ball bearings and into the locking member.

20. A method of assembling the swivel coupling of claim 1, comprising:

positioning the male member so that a longitudinal axis of the male member is vertical;

positioning the locking member around the male member such that the annular groove of the locking member is positioned in the vicinity of the annular groove of the male member, wherein an annular channel is defined between the locking member and the male member, with the annular channel having a cross-section larger than the diameter of the ball bearings;

dropping the plurality of ball bearings into the annular channel;

inserting the female member into the annular channel such that the annular groove of the female member is positioned adjacent the male member annular groove;

moving the locking member over an outer surface of the female member until the locking member is locked to the female member such that the annular grooves of the female, male, and locking members trap the plurality of ball bearings in the ball race.

21. The method of claim 20, wherein the dropping step further comprises positioning to plurality of ball bearings into the grooves of the male and locking members adjacent the second portion of the locking member.

22. The method of claim 21, further comprising:

positioning an annular seal between the male and female members in the central flow passageway such that the seal deters flow between the central flow passageway and the ball race.

23. The method of claim 20, wherein the locking member includes screw threads on an inner surface thereof and the female member includes screw threads on an outer surface thereof, and the moving step comprises rotating the locking member relative to the female member to mate the screw threads of the locking member to the screw threads of the female member such that the annular groove of the locking member aligns with the annular groove of the male member.

24. The method of claim 20, wherein each of the female and male members include attachment points at an end thereof, and further comprising coupling an additional part to the female member at the female member attachment point and coupling an additional part to the male member at the male member attachment point.

25. The method of claim 20, wherein the male member has an overlapped end and a non-overlapped end and the female member has an overlapping end, positioning the male member step further comprises positioning the overlapped end of the male member above the non-overlapped end, and the inserting the female member step further comprises inserting the overlapping end of the female member into the annular channel.

* * * * *

UNITED STATES PATENT AND TRADEMARK OFFICE
CERTIFICATE OF CORRECTION

PATENT NO. : 6,752,433 B2
APPLICATION NO. : 10/228656
DATED : June 22, 2004
INVENTOR(S) : Frost It is certified that error appears in the above-identified patent and that said Letters Patent is hereby corrected as shown below:

Col. 7, line 52, "looking" should read -- locking --.

Col. 7, line 55, "beatings" should read -- bearings --.

Col. 8, line 5, "to" should read -- the --.

Col. 8, line 11, "to" should read -- the --.

Signed and Sealed this

Fourth Day of September, 2007

JON W. DUDAS
*Director of the United States Patent and Trademark Office*